(12) United States Patent
Skarnes et al.

(10) Patent No.: US 9,765,906 B2
(45) Date of Patent: Sep. 19, 2017

(54) PIGGYBACK HOLDBACK CLAMP

(71) Applicant: NEXANS, Paris (FR)

(72) Inventors: Gunnar Skarnes, Halden (NO); Raymond Alexander Badowski, Rade (NO); Bjorn Roger Slora, Halden (NO)

(73) Assignee: NEXANS (FR)

( * ) Notice: Subject to any disclaimer, the term of this patent is extended or adjusted under 35 U.S.C. 154(b) by 51 days.

(21) Appl. No.: 13/924,700

(22) Filed: Jun. 24, 2013

(65) Prior Publication Data

US 2014/0061397 A1   Mar. 6, 2014

(30) Foreign Application Priority Data

Aug. 30, 2012  (NO) .................................. 20120976

(51) Int. Cl.
| | | |
|---|---|---|
| *F16L 3/10* | (2006.01) | |
| *F16L 3/26* | (2006.01) | |
| *F16L 3/20* | (2006.01) | |
| *H02G 3/32* | (2006.01) | |
| *B23K 37/053* | (2006.01) | |
| *F16L 55/17* | (2006.01) | |
| *F16L 53/00* | (2006.01) | |

(Continued)

(52) U.S. Cl.
CPC ........ *F16L 3/1066* (2013.01); *B23K 37/0533* (2013.01); *B23K 37/0535* (2013.01); *F16L 1/20* (2013.01); *F16L 3/237* (2013.01); *F16L 53/007* (2013.01); *F16L 55/17* (2013.01); *H02G 3/32* (2013.01); *H02G 3/0412* (2013.01)

(58) Field of Classification Search
CPC ... B23K 37/0533; B23K 37/0535; F16L 3/08; F16L 3/066; F16L 3/26; F16L 55/171; F16L 1/20; F16L 1/23; F16L 3/22; F16L 3/237; H02G 3/32

USPC ....... 248/62, 63, 65, 68.1, 74.1, 74.4, 316.1; 174/68.1, 70 R, 85; 138/99, 155; 285/363, 364, 366, 369, 373, 406, 417, 285/420
See application file for complete search history.

(56) References Cited

U.S. PATENT DOCUMENTS

| 1,630,423 | A | * | 5/1927 | Gothberg | ............... H02G 7/053 |
|---|---|---|---|---|---|
| | | | | | 174/150 |
| 1,884,223 | A | * | 10/1932 | Rah | ...................... H02G 15/115 |
| | | | | | 174/190 |

(Continued)

FOREIGN PATENT DOCUMENTS

| CN | 202252611 | 5/2012 |
|---|---|---|
| EP | 1686301 | 8/2006 |

(Continued)

OTHER PUBLICATIONS

International Search Report dated Aug. 12, 2016.
Australian Examination Report dated Sep. 12, 2016.
Norwegian Search Report dated Mar. 6, 2011.

*Primary Examiner* — Tan Le
(74) *Attorney, Agent, or Firm* — Sofer & Haroun, LLP

(57) ABSTRACT

A clamp is provided for mounting to a cable. The clamp has attachment means for connecting to a pipeline. Further, the clamp has plural clamp segments each with a curved section and tension devices connecting the clamp segments to each other to form a cylindrically shaped attachment area for accommodation of the cable in contact with the curved sections.

6 Claims, 4 Drawing Sheets

(51) Int. Cl.
 *F16L 1/20* (2006.01)
 *F16L 3/237* (2006.01)
 *H02G 3/04* (2006.01)

(56) References Cited

U.S. PATENT DOCUMENTS

| | | | |
|---|---|---|---|
| 2,230,287 A | | 2/1941 | Curtis |
| 2,690,193 A | | 9/1954 | Smith |
| 3,254,865 A | * | 6/1966 | Stickell ............................ 248/56 |
| 3,894,326 A | * | 7/1975 | Merriman .................... 228/49.3 |
| 4,505,006 A | * | 3/1985 | Andre ......................... 24/16 PB |
| 6,135,398 A | | 10/2000 | Quesnel |
| 6,390,139 B1 | * | 5/2002 | Kang ........................ F16L 9/22 138/120 |
| 6,575,412 B2 | | 6/2003 | Klezath |
| 7,216,795 B2 | * | 5/2007 | Garrison et al. ............... 228/212 |
| 8,770,537 B2 | * | 7/2014 | Go ................. 248/560 |
| 2003/0038217 A1 | * | 2/2003 | Rivers et al. ................ 248/74.1 |
| 2006/0243471 A1 | | 11/2006 | Karlsen et al. |
| 2007/0240893 A1 | | 10/2007 | Bremnes et al. |
| 2011/0154620 A1 | | 6/2011 | Whitelaw et al. |
| 2014/0346291 A1 | * | 11/2014 | Booth .......................... 248/74.4 |

FOREIGN PATENT DOCUMENTS

| | | |
|---|---|---|
| EP | 1850044 | 10/2007 |
| GB | 570913 A | 7/1945 |
| NO | 332620 | 11/2012 |

* cited by examiner

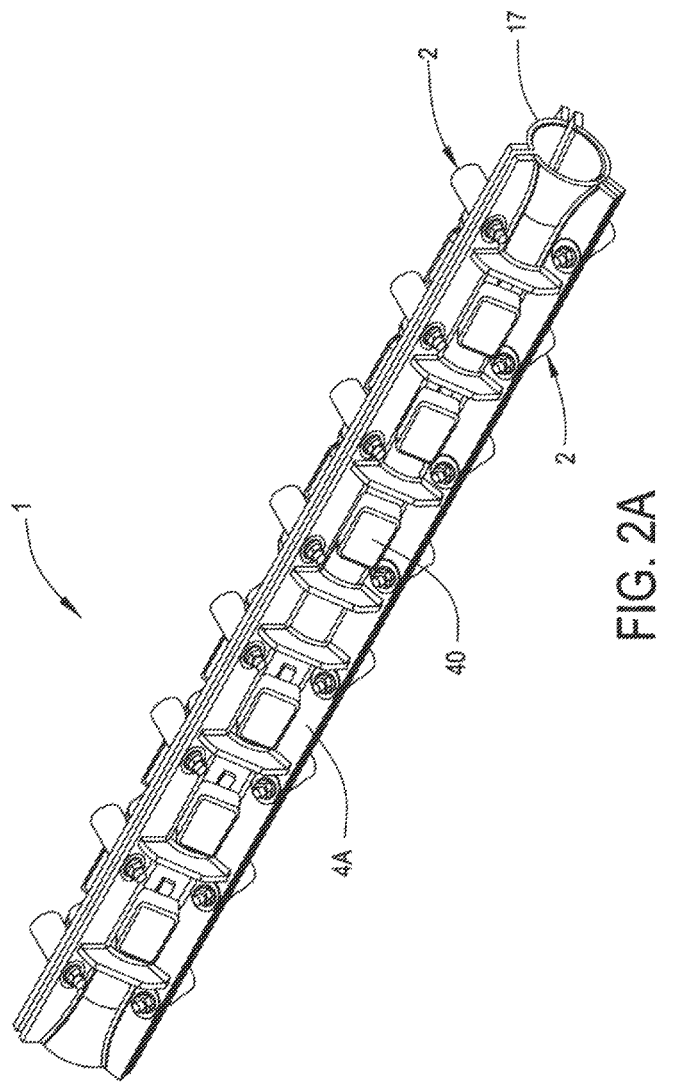

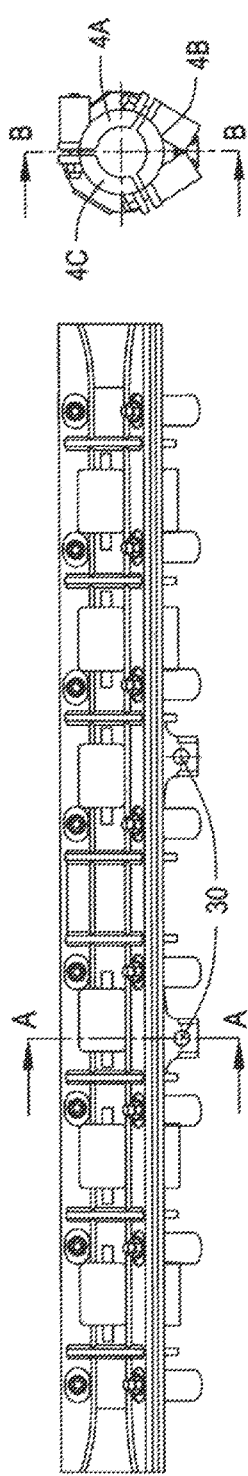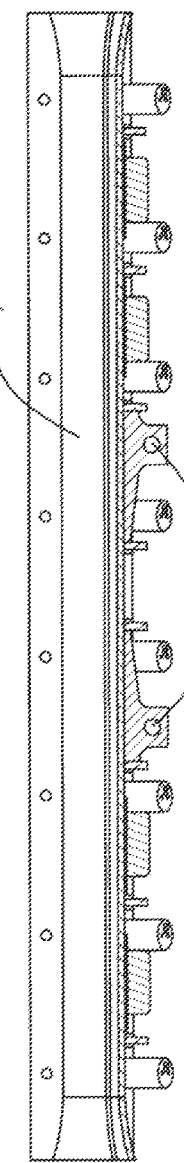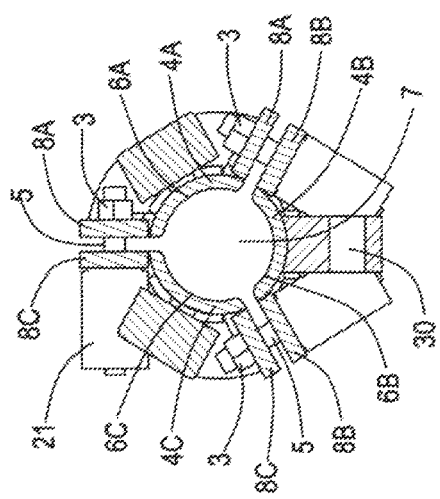

PIGGYBACK HOLDBACK CLAMP

RELATED APPLICATION

This application claims the benefit of priority from Norwegian Patent Application No. 2012 0976, filed on Aug. 30, 2012, the entirety of which is incorporated by reference.

BACKGROUND

Field of the Invention

The present invention relates to a clamp adapted for mounting a cable. The clamp is also provided with attachment means for providing connection to a pipe, pipeline or other elongated members to which it is desirable to attach the cable. More specifically, the invention may be used to fixate subsea electrical power cables to a pipeline, and the invention may be useful in a Direct Electric Heating (DEH) system for a pipeline.

Description of Related Art

The Direct Electric Heating system provides an alternative solution to the mainly used chemical treatments for preventing formation of hydrates or wax plug blocking or impeding the fluid flow through a subsea pipeline. In the Direct Electric Heating system, a power supply such as a cable may be connected to an electrically insulated metallic pipe in a "piggybacked" manner. The cable supplies a current to metallic parts of the pipeline such as the pipe walls, which are used as a conductor generating a heating effect to prevent the formation of hydrates.

Due to the hot well stream flowing through the pipeline, the pipeline expands thermally. To ensure a stable system it is important that an electrical connection between the cable supplying current to the conductor of the pipeline and the pipeline itself is maintained also during thermal expansions of the pipeline. Prior art solutions of fixing the cable to the pipeline have shown to be fragile during offshore handling and welding. It is therefore an object of the invention to provide a solution without the drawbacks of the prior art solution.

OBJECTS AND SUMMARY

The present invention provides a simple solution for the reliable connection of a cable to a pipeline. The invention ensures that the there is no damage to the cable during the thermal expansions of the pipeline.

In accordance with the invention a clamp is adapted for mounting to a cable. The clamp has also attachment means for connecting to a pipeline. The attachment means may comprise holes for connecting the clamp holding the cable to the pipeline, and suitable locking means such as bolts and nuts or other suitable securing means providing a secure connection between the clamp and the pipeline.

The clamp comprises plural clamp segments each with a curved section. The curved section of the clamp segments form a cylindrical shaped attachment area for accommodation of the cable in contact with the curved sections. Further the clamp also includes tension devices connecting the clamp segments to each other to form the cylindrical shaped attachment area for the accommodation of the cable. The tension devices keep the clamp segments in position and provide tension to the clamp, thereby providing a necessary clamping force to the cable to be received in the clamp. The tension device may comprise a locking part for connecting two and two clamp segments and a spring part providing the clamping force to the cable, wherein the spring part also makes it possible for the clamp to accommodate a cable with varying diameter.

In one embodiment the clamp has a length arranged in parallel to the longitudinal direction of the cable when the clamp is mounted to the cable. Plural tension devices are spaced in the length direction of the clamp, thereby providing an even distribution of the clamping force onto the cable. The longitudinal extension of the clamp and the arrangement of tension devices arranged in the longitudinal direction of the clamp, provides for an even distribution of the clamping force onto a length of the cable, without risking damaging of the cable due to stress concentration resulting from clamping force applied onto a short portion of the cable. Each clamp segment may have two longitudinal edges arranged in parallel to the longitudinal direction of the cable, when the cable is accommodated in the clamp. The tension devices may be spaced along the longitudinal edges connecting the clamp segments to each other. The number of clamp segments making up the clamp may be chosen by the skilled person dependent on technical specifications, but may in one application comprise at least three clamp segments. The use of at least three clamp segments ensures that the clamping force is distributed in an efficient manner onto the cable. When the number of clamp segments is three, the clamp may be arranged with three sets of tension devices, each set running along the longitudinal edges of the two neighboring clamp segments. The individual set of tension devices may comprise several tension devices, but an embodiment where just one tension device is used for the attaching adjoining clamp segments, thus making the number of total tension devices for the clamp three, is also possible.

Each clamp segment may be arranged with two flanges, each running along each of the longitudinal edges of the clamp segment. Each flange will then be arranged adjacent a flange of an adjoining clamp segment, providing anchorage for the tension devices. Holes may be formed in each flange and when positioning the 30 clamp segments in order to connect these together, the holes of one flange overlay the holes of the adjoining attachment flange in an aligned manner. For the further fixation of the tension device to the clamp segments, the locking part such as a bolt being part of the tension device may be inserted through the holes of the attachment flanges and fastened thereto by a nut. As the skilled person will realize the tension device may be arranged with other means than a bolt and a nut for securing the adjoining clamp segments.

The clamp according to the invention, may be used in various applications where a cable is to be attached to the pipeline. However, the clamp may be considered especially useful when employed to connect a cable to a pipeline both being part of a Direct Electric Heating (DEH) system. The pipeline to which the cable is to be attached by the inventive clamp, extends from a topside structure to a subsea installation. The cable is to be attached to the pipeline at two locations, wherein the clamp is adapted for attaching the cable to the pipeline at a so called near end location of the pipeline. A near end location is the attachment location which is closest to the topside structure.

BRIEF DESCRIPTION OF THE DRAWINGS

An embodiment of the invention will be described in the following with reference to the figs which show an example of an embodiment of the invention, wherein

FIGS. 2a-2e show an embodiment of a clamp for a cable in accordance with the invention.

DETAILED DESCRIPTION

Figure 1:
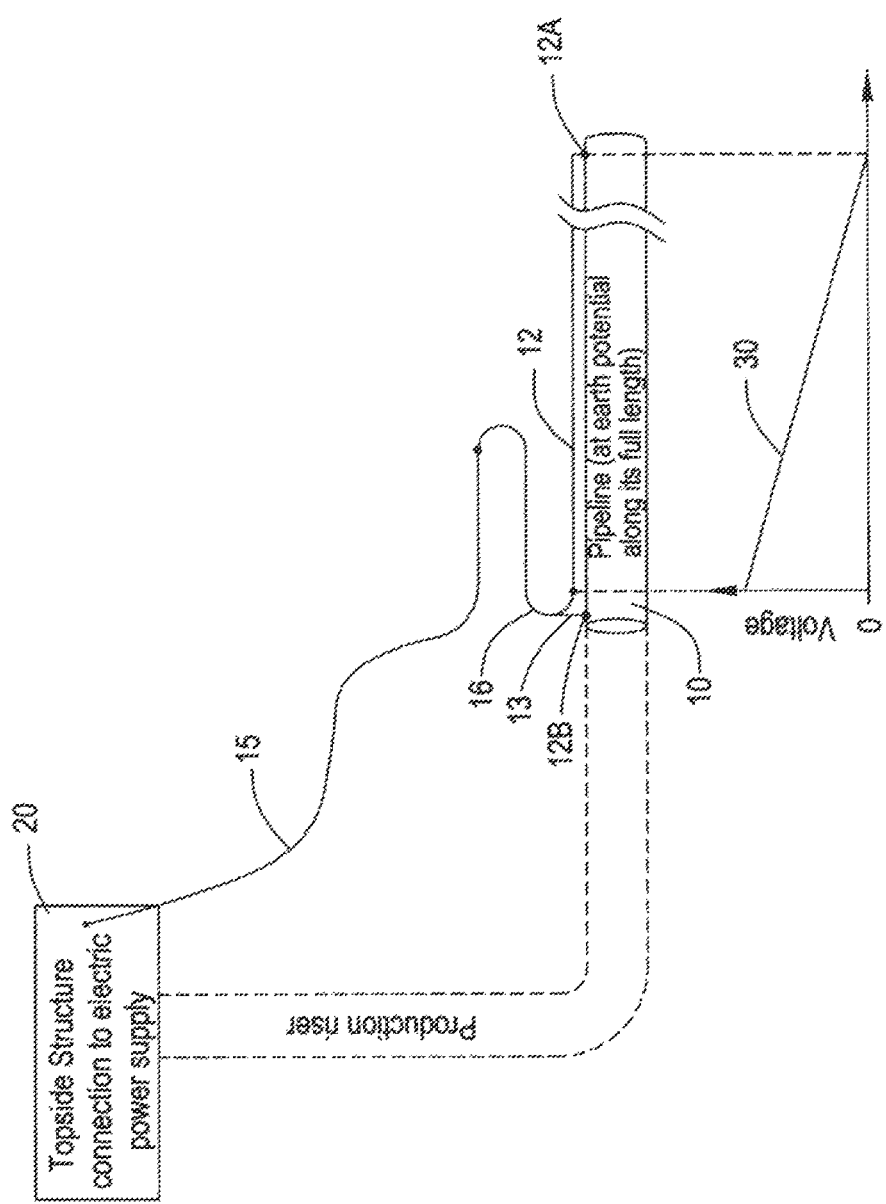
FIG. 1 shows a Direct Electric Heating system where a cable is installed onto a pipeline.

FIG. 1 presents an overview of a pipeline 10 with a direct electric heating system (DEH). An electric power supply unit (not shown) is arranged on a topside structure 20 such as platform, ship or vessel. A riser cable 15 for instance a two-conductor supply cable, has one end attached to the topside structure 20 and the other end connected to a cable 12 which is arranged onto the pipeline 10 in a piggyback manner.

In the embodiment in FIG. 1, the pipeline 10 is provided with two conductors (not shown) for the heating of the pipeline. The two conductors of the pipeline 10 are each electrically connected to the each of the conductors of the cable 16 at two spaced apart locations. At a near end location 12b of the pipeline 10 where the cable 16 first arrives at the pipeline 10, when moving from the top side structure 20 and in the direction of the subsea installation as shown in FIG. 1, one of the conductors 13 of the cable 16 is connected to one of the conductors of the pipeline 10. This first location for connection between the cable and pipeline is called a near end location 12b of the pipeline 10, as this location for connection is positioned closest to the top structure 20. If the cable 16 is a coaxial cable, the concentric conductor is connected to the pipeline at this near end location 12b of the pipeline 10. The other conductor, for instance the central conductor, if the cable is a coaxial cable, is connected to the cable 12 extending from the near end 12b of the pipeline 10 to a location called a far end 12a of the pipeline 10, where the cable 12 is connected to the other of the conductors of the pipeline 10. The expression far end 12a of the pipeline refers to the location being the farthest connection between the cable and pipeline away from the top structure 20. As an alternative solution to a coaxial cable from the top structure, two separate cables could be arranged to arrive at the near end location 12b.

The curve 30 shown in the diagram below the pipeline 10 illustrates the electric potential difference of piggyback cable 12 between the near end location 12b and the far end location 12a, with respect to electric earth. The curve drops down to zero at the far end location 12a of the pipeline, as the cable 12 is grounded to earth at the far end location 12a.

FIGS. 2a-2e show various views of an embodiment of a clamp 1 for fixing the cable 12 to the pipeline 10 in a piggyback manner, for instance at a position at the near end location 12b. The clamp 1 is arranged with holes 30 for attaching the clamp 1 to the pipeline 10. At each end of the clamp 1 there is a conical shaped outlet portion 17.

The clamp 1 has a cylindrically shaped attachment area 7 for accommodating and fixing the cable 12 in its longitudinal and lateral direction as well as preventing rotation of the cable. The clamp 1 is shown in the figs having three clamp segments 4a, 4b and 4c assembled to provide a necessary holding or clamping force to the cable 12. The three clamp segments 4a, 4b and 4c are tightened around the cable 12 by the use of tension devices 2. Each tension device attaches two clamp segments to each other in the circumferential direction of the clamp 1 using a bolt 5 and a nut 3. The fastening of three clamp segments 4a, 4b and 4c requires at least three tension devices for attaching the clamp segments to each other, thereby assembling a clamp 1 with a cylindrical shape.

Each clamp segment 4a, 4b and 4c has two flanges 8a, 8b and 8c. The flange of one of the clamp segments faces the flange of a neighboring clamp segment to which it is to be attached. Neighboring flanges are connected by mounting a bolt 5 in each hole in the flanges and then fasten with a nut 3.

In the embodiment of the clamp 1 as shown in the FIGS. 2a-2e, plural tension devices 2 are arranged as sets connecting the flanges 8a, 8b and 8c of the clamp segments 4a, 4b and 4c. The longitudinal direction of the clamp 1 is parallel to the longitudinal direction of the cable 12, when the clamp is mounted on the cable 12. With the cable 12 in the cylindrically shaped attachment area 7, the tension provided by the plural tension devices 2 provides a sufficient clamping force along the longitudinal direction of the clamp 7 onto the cable 12, enabling a fixation of the cable 12 even if the pipeline expands due to hot well flow. The cylindrically shaped attachment area 7 for receiving the cable 12 is made up by curved sections 6a, 6b and 6c of the clamp segments 4a, 4b and 4c, forming a cylindrical shaped attachment area 7 when assembled as shown in FIGS. 2a-2e. When the clamp is arranged around the cable 12 in a clamping position, the curved sections 6a, 6b and 6c are positioned in contact with the cable 12. The tension devices 2 connect the clamp segments 4a, 4b and 4c with a necessary tension force holding the clamps segments 4a, 4b and 4c in a position providing a tension force to the cable ensuring the fixation of the cable. The arrangement of plural tension devices 2 spaced along the longitudinal direction of the clamp, provides for an even distribution of the necessary holding force from the clamp 1 to the cable 12 along the length of the cable 12, without risking a stress concentration and a consequential damaging of the cable 12. Each of the tension devices 2 as shown in the embodiment in the figs includes a spring like element 21. The spring like elements allows the clamp 1 to absorb the possible deviation of the diameter of the cable without affecting the clamping force provided by the clamp 1 to the cable 12. Anodes 40 are seen distributed along the clamp 1. These are sacrificial anodes serving the purpose of corrosion protection for the clamp 1.

Figure 3:
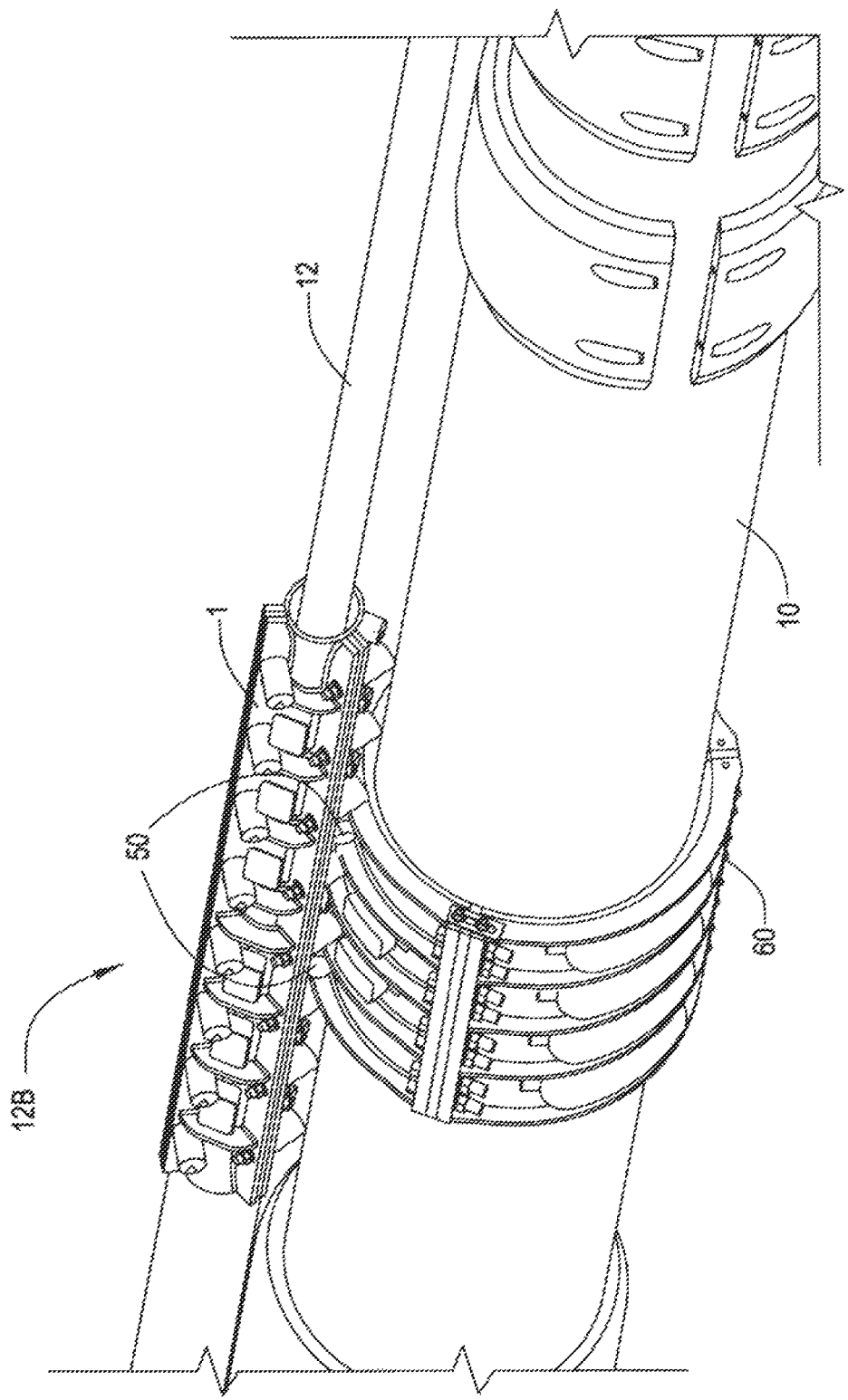
FIG. 3 shows a cable installed in a cable clamp which is fixed to a pipeline.

FIG. 3 shows an example of the clamp 1 holding the cable 12 and being connected to the pipeline 10 at a near end location 12b. The clamp 1 is secured to the pipeline by locking means 50 such as bolts and nuts inserted through the holes 30 of the clamp 1 and holes provided in a pipe clamp 60 which is attached to the pipeline 10. When installing the clamp 1, the clamp segments 4a, 4b and 4c are mounted around the cable 12 and connected to each other by fastening the tension devices 2 to the flanges 8a, 8b, 8c. Alternatively, the clamp segments 4a, 4b, 4c may be connected together, before the cable 12 is inserted into the attachment area and the tension devices 2 tightened by nut and bolts 3, 5 to provide the necessary clamping force.

As the skilled person will understand one or more clamps may be used for the same installation. Further, the clamp in accordance with the invention may be used in other applications than the one shown in FIG. 1. In situations where it is necessary to provide a sufficient clamping force to a cable and where the cable needs to be attached to an elongated member such as a pipeline, the clamp in accordance with the invention may be useful.

The invention claimed is:

1. A clamp for mounting to a cable to connect the cable with a pipeline, wherein the clamp has an attachment means for connecting the clamp and mounted cable therein to a pipeline, said clamp comprising:

a plurality of clamp segments each constructed having a longitudinal length relative to the longitudinal axis of said cable, and each of said segments with a curved section connected longitudinally to each other by tension devices to form a cylindrically shaped attachment area for accommodation of the cable in contact with the curved sections of said cable, wherein the longitudinal length of the clamp segments, combined with the number of and location of said tension devices along the length of each clamp segment is such that, when the clamp segments are mounted to the cable, they provide a holding force evenly applied to the cable, wherein at least three clamp segments make up the clamp and the number of tension devices corresponds at least to the number of clamp segments, wherein each clamp segment has two longitudinal edges arranged in parallel to the longitudinal direction of the cable, when the clamp is mounted to the cable, and that the tension devices are spaced along the longitudinal edges connecting the clamp segments to each other, wherein each clamp segment has two flanges each extending along each of the longitudinal edges of the clamp segment, and when mounting the clamp to the cable, each flange is arranged adjacent a flange of an adjoining clamp segment, and connected to this adjoining clamp segment by the tension devices, and wherein each of the tension devices includes a spring like element configured and arranged so as to absorb the possible deviation of the diameter of the cable along its length.

2. A clamp in accordance claim 1, wherein the clamp has a length arranged in parallel to the longitudinal direction of the cable when the clamp is mounted to the cable, and that plural tension devices are spaced in the length direction of the clamp thereby providing for an even distribution of the clamping force onto the cable.

3. A clamp in accordance with claim 1, wherein each flange is provided with holes to be aligned with holes in the flange of the adjoining clamp segment, and a locking part of the tension devices is arranged through each pair of the aligned holes and connects the adjoining clamp segments.

4. A clamp in accordance with claim 1, wherein the cable and the pipeline are included as part of a Direct Electric Heating system and the cable is arranged on the pipeline.

5. A clamp in accordance claim 1, wherein the pipeline extends from a topside structure to a subsea installation and the cable is attached to the pipeline at two locations, wherein the clamp is adapted for attachment of the cable to the pipeline at a near end location closest to the topside structure.

6. A clamp in accordance with claim 1, wherein the attachment means is at least one through hole arranged in at least one of the flanges of at least one clamp segments of the clamp for connecting the pipeline and the cable within the clamp by suitable locking means.

* * * * *